United States Patent
Fujii

(10) Patent No.: US 8,442,378 B2
(45) Date of Patent: May 14, 2013

(54) VIDEO RECORDING DEVICE

(75) Inventor: Noriyuki Fujii, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 884 days.

(21) Appl. No.: 12/292,390

(22) Filed: Nov. 18, 2008

(65) Prior Publication Data

US 2009/0129758 A1    May 21, 2009

(30) Foreign Application Priority Data

Nov. 20, 2007  (JP) .................. 2007-299987

(51) Int. Cl.
*H04N 5/765* (2006.01)
*H04N 7/01* (2006.01)
*H04N 11/22* (2006.01)

(52) U.S. Cl.
USPC ........... 386/232; 386/200; 348/441; 348/443; 348/445; 348/454

(58) Field of Classification Search ........... 348/441, 348/443, 445, 454; 386/232, 200
See application file for complete search history.

(56) References Cited

U.S. PATENT DOCUMENTS

| | | | | |
|---|---|---|---|---|
| 5,649,048 A | * | 7/1997 | Tomita et al. ............. | 386/232 |
| 2002/0064370 A1 | * | 5/2002 | Berkheimer et al. ....... | 386/52 |
| 2004/0184767 A1 | | 9/2004 | Maruyama et al. ......... | 386/46 |
| 2006/0204212 A1 | * | 9/2006 | Kinaka ..................... | 386/52 |

FOREIGN PATENT DOCUMENTS

| | | |
|---|---|---|
| JP | 05-219525 | 8/1993 |
| JP | 2004-236194 | 8/2004 |
| JP | 2005310283 * | 4/2005 |
| JP | 2005-310283 A | 11/2005 |
| JP | 2006-323940 | 11/2006 |
| JP | 2007-026509 | 2/2007 |

OTHER PUBLICATIONS

Machine Translation of JP-2005310283, Asano Tomoji, Apr. 2005.*

* cited by examiner

Primary Examiner — Daquan Zhao
(74) Attorney, Agent, or Firm — Morgan, Lewis & Bockius LLP

(57) ABSTRACT

A video recording device includes: a first identification block that reads video information from a first recording medium in which video information on an analog television broadcast is stored, and identifies the broadcasting format of the read video information; a recording execution block that records the video information, which is read from the first recording medium, in a second recording medium other than the first recording medium; a second identification block that when the video information is recorded in the second recording medium by the recording execution block, identifies the broadcasting format of the video information to be recorded in the second recording medium; and a format decision block that decides whether the broadcasting format identified by the second identification block agrees with the broadcasting format identified by the first identification block. When the format decision block decides that the broadcasting formats do not agree with each other, the recording execution part records the video information in the second recording medium according to the broadcasting format identified by the first identification block.

10 Claims, 4 Drawing Sheets

VIDEO RECORDING DEVICE

This application is based on Japanese Patent Application No. 2007-299987 filed on Nov. 20, 2007, and the contents of which are hereby incorporated by reference.

BACKGROUND OF THE INVENTION

1. Field of the Invention

The present invention relates to a video recording device capable of reading video information from a first recording medium in which video information on an analog television broadcast is stored, and recording the video information in a second recording medium other than the first recording medium. More particularly, the invention is concerned with a hard disk drive (HDD) (or digital versatile disk (DVD)) recorder including an HDD (or DVD) recording/reproducing block and a video cassette recorder (VCR).

2. Description of the Related Art

In recent years, video recording devices including a HDD (or DVD) recorder capable of reproducing or recording data from or in multiple types of recording media, for example, a magnetic tape such as a video cassette (VC) and a hard disk drive (HDD) (or an optical disk such as a digital versatile disk (DVD)) have prevailed.

In the video recording devices, dubbing processing from an analog recording medium such as a VC in which video information on an analog television broadcast is stored to a digital recording medium such as an HDD or DVD can be carried out. For convenience in the dubbing processing, various methods and devices have been proposed.

For example, disclosed as the invention in JP-A-2005-310283 is a dubbing device that identifies a broadcasting format of data recorded in a magnetic tape medium, that when identifying a broadcasting format different from a broadcasting format of data recorded in a digital recording medium, suspends recording of data in the digital recording medium, and that when identifying the broadcasting format identical to that of the recorded data, records data in the digital recording medium.

On the other hand, for an analog television broadcast, there are broadcasting formats including a phase alternating line (PAL) format and a sequential couleur a memoire (SECAM) format. In the dubbing device or any other conventional video recording device, dubbing from an analog recording medium such as a VC, in which video information on an analog television broadcast is stored, to a digital recording medium such as an HDD or DVD may not be appropriately carried out (for example, without loss of video definition).

For example, when the SECAM format is identified at the time of reading video information from an analog recording medium such as a magnetic tape, or when the PAL format is identified at the time of recording video information in a digital recording medium such as an HDD or DVD, degradation in video definition derived from loss of color information in the video information or the like may occur.

SUMMARY OF THE INVENTION

An object of the invention is to provide a video recording device capable of properly dubbing video information on an analog television broadcast.

In order to accomplish the above object, a video recording device in accordance with the invention includes: a first identification part that reads video information from a first recording medium in which video information on an analog television broadcast is stored, and identifies the broadcasting format of the read video information; a recording execution part that records the video information, which is read from the first recording medium, in a second recording medium other than the first recording medium; a second identification part that when the video information is recorded in the second recording medium by the recording execution part, identifies the broadcasting format of the video information to be recorded in the second recording medium; a format decision part that decides whether the broadcasting format identified by the second identification part agrees with the broadcasting format identified by the first identification part. When the format decision part decides that the broadcasting formats do not agree with each other, the recording execution part records the video information in the second recording medium according to the broadcasting format identified by the first identification part.

In the video recording device of this invention, video information is read from the first recording medium in which video information on an analog television broadcast is stored, and the broadcasting format of the read video information is identified. When the video information read from the first recording medium is recorded in the second recording medium other than the first recoding medium, the broadcasting format of the video information to be recorded in the second recording medium is identified. Whether the broadcasting format identified at the time of recording the video information in the second recording medium agrees with the broadcasting format identified at the time of reading the video information from the first recording medium is decided. If a decision is made that the broadcasting formats do not agree with each other, the video information is recorded in the second recording medium according to the broadcasting format identified at the time of reading the video information from the first recording medium. The video information on the analog television broadcast can therefore be properly dubbed.

For example, assuming that the broadcasting format identified at the time of reading is the sequential couleur a memoire (SECAM) format and the broadcasting format identified at the time of recording is the phase alternating line (PAL) format, the video information is recorded according to the SECAM format identified at the time of reading. Degradation in video definition of video information derived from loss of color information in the video information or the like will not take place, so video information on an analog television broadcast can be properly dubbed.

Specifically, when video information is read, the video information is reproduced in a form in which it can be properly displayed on a display. When the video information is recorded in the second recording medium according to the broadcasting format identified at the time of reading the video information from the first recording medium, the video information on an analog television broadcast can be properly dubbed.

Moreover, in the video recording device of the invention, the broadcasting format of video information stored in the first recording medium is the PAL format or SECAM format. The video recording device further includes a format conversion part that when the broadcasting format identified by the first identification part is the SECAM format, converts the video information of the SECAM format into video information of the PAL format. When the broadcasting format identified by the first identification part is the SECAM format, the recording execution part records the video information, which has the broadcasting format thereof converted into the PAL format by the format conversion part, in the second recording medium.

Consequently, according to the video recording device of this invention, the broadcasting format of video information stored in the first recording medium is the PAL format or SECAM format. When the broadcasting format identified at the time of reading the video information from the first recording medium is the SECAM format, the video information of the SECAM format is converted into video information of the PAL format, and the video information having the broadcasting format thereof converted into the PAL format is recorded in the second recording medium. Eventually, the video information on an analog television broadcast can be further properly dubbed.

Specifically, when the broadcasting format identified at the time of reading video information from the first recording medium is the SECAM format, the video information having the broadcasting format thereof converted into the PAL format is recorded in the second recording medium. Since the broadcasting format of video information to be recorded in the second recording medium is unified into the PAL format, reproduction of the video information recorded in the second recording medium becomes easy to do. The video information on an analog television broadcast can be further properly dubbed.

Moreover, in the video recording device of this invention, the first recording medium may be an analog recording medium and the second recording medium may be a digital recording medium. In this case, the video information on an analog television broadcast stored in the analog recording medium can be properly dubbed into the digital recording medium.

In the video recording device of this invention, the first recording medium may be a magnetic tape and the second recording medium may be a hard disk drive (HDD) or a digital versatile disk (DVD). Video information on an analog television broadcast stored in the magnetic tape can be properly dubbed into the HDD or DVD.

Moreover, in the video recording device of this invention, the first recording medium may be a digital recording medium and the second recording medium may be an analog recording medium. Since the first recording medium is the digital recording medium and the second recording medium is the analog recording medium, video information on an analog television broadcast stored in the digital recording medium can be properly dubbed into the analog recording medium.

Further, in the video recording device of this invention, the first recording medium may be a HDD or a DVD and the second recording medium may be a magnetic tape. Since the first recording medium is the HDD or DVD and the second recording medium is the magnetic tape, video information on an analog television broadcast stored in the HDD or DVD can be properly dubbed into the magnetic tape.

DESCRIPTION OF THE PREFERRED EMBODIMENTS

Figure 1:
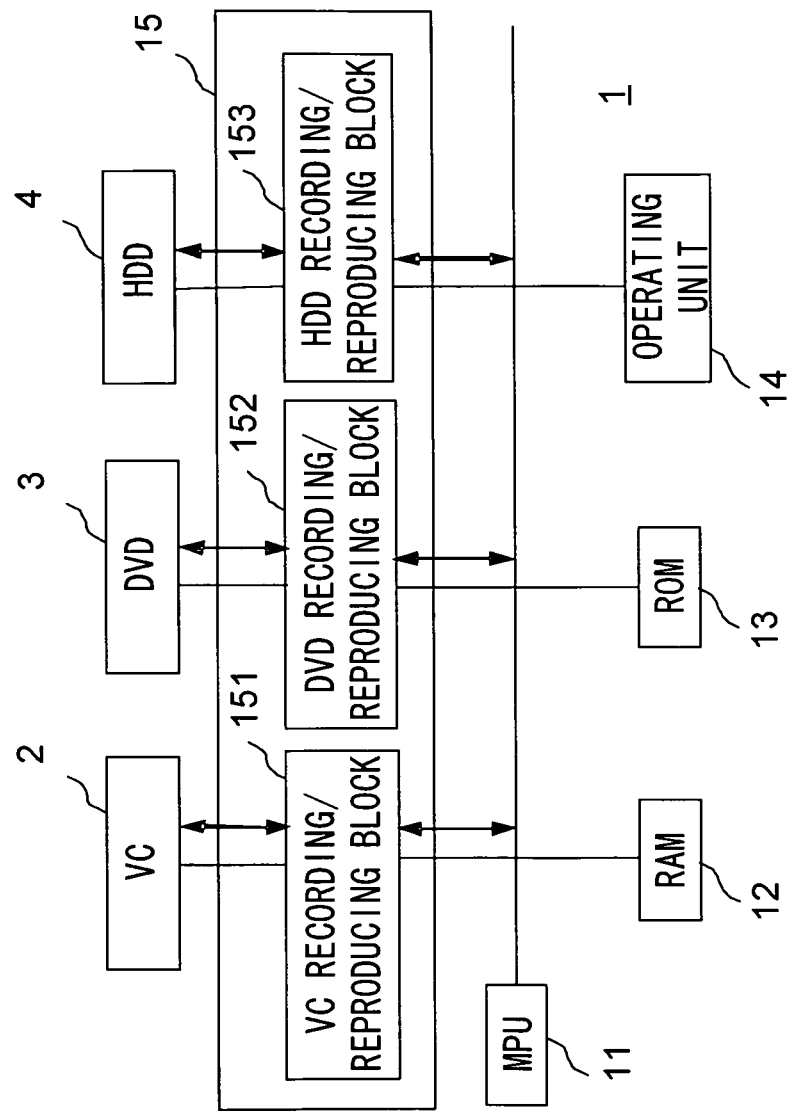
FIG. 1 is a block diagram showing an example of the constitution of a DVD recorder in accordance with this invention.

Referring to the drawings, an embodiment of the invention will be described below. FIG. 1 is a block diagram showing an example of the constitution of a DVD recorder in accordance with the invention. The DVD recorder 1 (that is a DVD recorder having an HDD or a VCR incorporated therein and is equivalent to a video recording device) records (dubs) video information on an analog television broadcast, which is stored in one of three types of recording media of a video cassette (VC) to be loaded in a video cassette recorder (VCR), a digital versatile disk (DVD), and a hard disk drive (HDD), into any other recording medium.

Moreover, the DVD recorder 1 includes a micro-processing unit (MPU) 11, a random access memory (RAM) 12, a read-only memory (ROM) 13, an operating unit 14, and a recording/reproducing unit 15. Further, the recording/reproducing unit 15 includes a VC recording/reproducing block 151, a DVD recording/reproducing block 152, and an HDD recording/reproducing block 153.

The MPU 11 controls the overall operation of the DVD recorder 1. In the RAM 12, information such as audio information or video information is stored so that it can be freely read or written. In the ROM 13, a control program causing the MPU 11 to act is stored. The operating unit 14 receives various manipulations of turning on the power supply, turning off the power supply, selecting a recording medium serving as a dubbing source or dubbing destination, and others.

The VC recording/reproducing block 151 (equivalent to part of a recording execution part) functions as a VCR. A VC 2 is freely loaded or unloaded into or from the VC recording/reproducing block 15. In response to an instruction sent from the MPU 11, the VC recording/reproducing block 151 reads video information on an analog television broadcast that is stored in the VC 2, and/or records (writes) video information on an analog television broadcast in the VC 2.

A DVD 3 is freely loaded or unloaded into or from the DVD recording/reproducing block 152 (equivalent to part of the recording execution part). In response to an instruction sent from the MPU 11, the DVD recording/reproducing block 152 reads video information on an analog television broadcast that is stored in the DVD 3, or records (writes) video information on an analog television broadcast in the DVD 3.

In response to an instruction sent from the MPU 11, the HDD recording/reproducing block 153 (equivalent to part of the recording execution part) reads video information on an analog television broadcast that is stored in an HDD 4, or records (writes) video information on an analog television broadcast in the HDD 4.

Moreover, the VC 2 (equivalent to a magnetic tape) to be loaded into the VC recording/reproducing block 151 is equivalent to an analog recording medium (a recording medium in which video information is recorded in the form of an analog signal), and the DVD 3 to be loaded into the DVD recording/reproducing block 152 and the HDD 4 are equivalent to digital recording media (recording media in which video information is recorded in the form of digital information).

Incidentally, the broadcasting format of video information to be stored in one of the VC 2, DVD 3, and HDD 4 is the phase alternating line (PAL) format or sequential couleur a memoire (SECAM) format.

Figure 2:
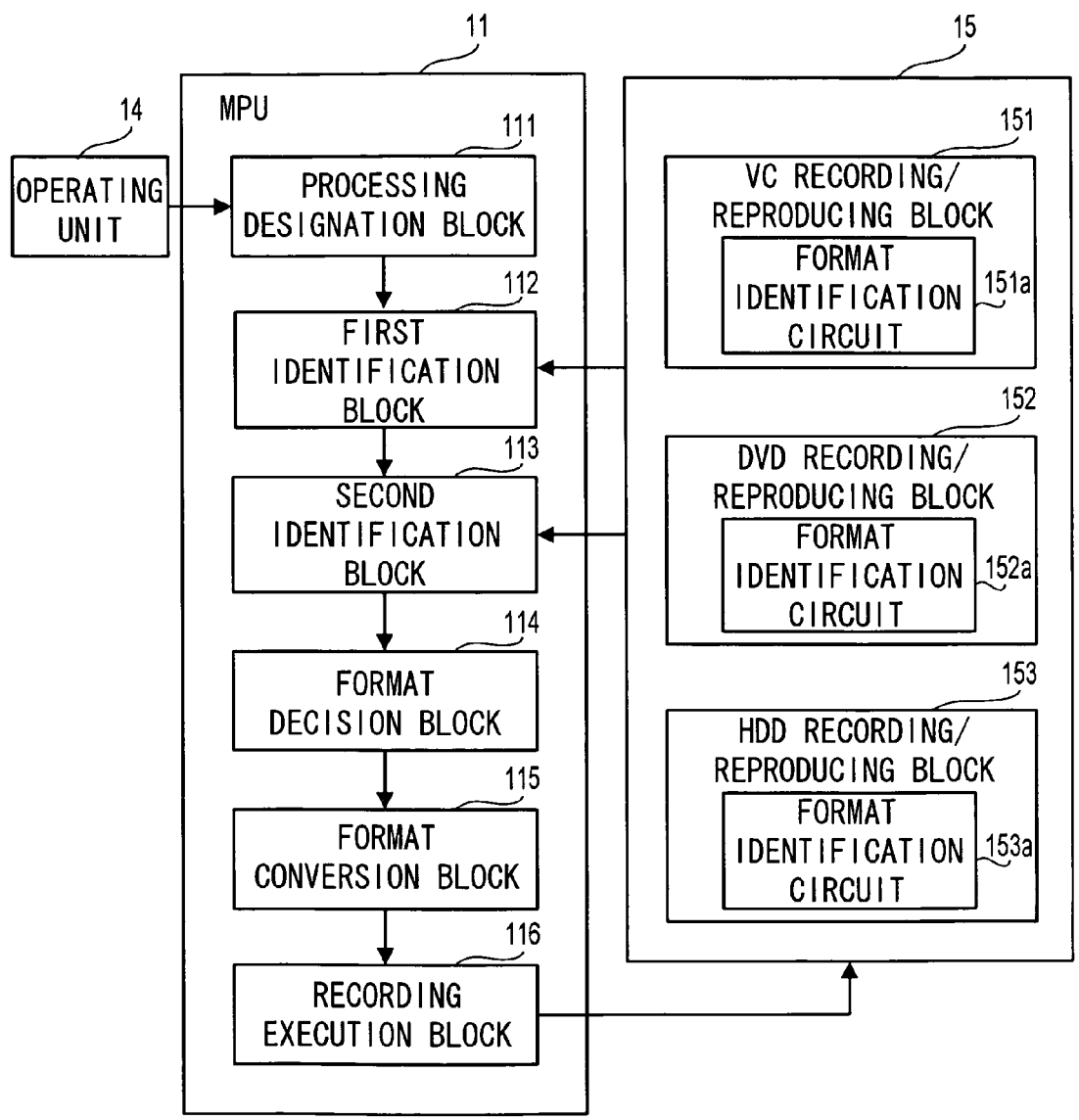
FIG. 2 is a block diagram showing an example of the constitution of the major part of the DVD recorder in accordance with this invention.

FIG. 2 is a block diagram showing an example of the constitution of the major part of the DVD recorder 1 in accordance with this invention. The MPU 11 functionally includes a processing designation block 111, a first identification block 112, a second identification block 113, a format decision block 114, a format conversion block 115, and a recording execution block 116. Moreover, the VC recording/reproducing block 151, DVD recording/reproducing block 152, and HDD recording/reproducing block 153 include format identification circuits 151a, 152a, and 153a respectively.

Herein, the MPU 11 reads and runs a control program that is stored in advance in the ROM 13 or the like shown in FIG. 1, whereby the MPU 11 functions as the functional blocks of the processing designation block 111, first identification block 112, second identification block 113, format decision block 114, format conversion block 115, and recording execution block 116.

Moreover, among various kinds of data items stored in the RAM 12 and ROM 13 shown in FIG. 1, data that can be stored in a recording medium capable of being loaded or unloaded may be able to be read by a driver, for example, a hard disk drive, an optical disk drive, a flexible disk drive, a silicon disk drive, or a cassette medium reader. In this case, the recording medium is, for example, a hard disk, an optical disk, a flexible disk, a compact disk (CD), a DVD, or a semiconductor memory.

The format identification circuit 151a (equivalent to part of a first identification part and part of a second identification part) is a circuit that when video information stored in the VC 2 is read in response to an instruction sent from the MPU 11 (first identification block 112 or second identification block 113), identifies the broadcasting format of the read video information, and that when video information is recorded in the VC 2, identifies the broadcasting format of the video information to be recorded.

The format identification circuit 152a (equivalent to part of the first identification part and part of the second identification part) is a circuit that when video information stored in the DVD 3 is read in response to an instruction sent from the MPU 11 (first identification block 112 or second identification block 113), identifies the broadcasting format of the read video information, and that when video information is recorded in the DVD 3, identifies the broadcasting format of the video information to be recorded.

The format identification circuit 153a (equivalent to part of the first identification part and part of the second identification part) is a circuit that when video information stored in the HDD 4 is read in response to an instruction sent from the MPU 11 (first identification block 112 or second identification block 113), identifies the broadcasting format of the read video information, and that when video information is recorded in the HDD 4, identifies the broadcasting format of the video information to be recorded.

In the present embodiment, since the broadcasting format of video information to be stored in the VC 2, DVD 3, or HDD 4 is the PAL format or SECAM format, the format identification circuits 151a, 152a, and 153a, respectively, identify the broadcasting format of video information to be recorded as the PAL format or the SECAM format. Moreover, the format identification circuits 151a, 152a, and 153a that are circuits which identify the broadcasting format of the video information to be recorded as the PAL format or SECAM format may be formed with known identification circuits (for example, identification circuits described in JP-A-8-51645 or JP-A-2003-18608).

The processing designation block 111 receives a manipulative input from a user via the operating unit 14. Based on the received manipulative input, the processing designation block 111 designates one (for example, the VC 2) of the three types of recording media of the VC 2, DVD 3, and HDD 4 as a first recording medium that is a recording medium (dubbing source recording medium) from which video information is read, and designates any other recording medium (for example, the HDD 4) as a second recording medium that is a recording medium (dubbing destination recording medium) in which the video information is recorded. Moreover, the processing designation block 111 receives the manipulative input from a user via the operating unit 14. Based on the received manipulative input, the processing designation block 111 receives an instruction signifying that dubbing processing should be executed in order to record the video information stored in the first recording medium (herein the VC 2) into the second recording medium (herein the HDD 4).

The first identification block 112 (equivalent to part of the first identification part) reads video information on an analog television broadcast from the first recording medium (herein the VC 2) designated by the processing designation block 111, and identifies the broadcasting format of the read video information via the format identification circuit 151a, 152a, or 153a (herein the format identification circuit 151a) associated with the first recording medium (herein the VC 2).

When the recording execution block 116 records video information in the second recording medium (herein the HDD 4) designated by the processing designation block 111, the second identification block 113 (equivalent to part of the second identification part) identifies the broadcasting format of the video information to be recorded in the second recording medium (herein the HDD 4) via the format identification circuit 151a, 152a, or 153a (herein the format identification circuit 153a) associated with the second recording medium (herein the HDD 4).

The format decision block 114 (equivalent to a format decision part) decides whether the broadcasting format identified by the second identification block 113 agrees with the broadcasting format identified by the first identification block 112.

The format conversion block 115 (equivalent to a format conversion part) converts video information of the SECAM format into video information of the PAL format (executes so-called PAL conversion), when the broadcasting format identified by the first identification block 112 is the SECAM format.

The recording execution block 116 (equivalent to part of the recording execution part) records video information in the second recording medium (herein the HDD 4), which is designated by the processing designation block 111, via the recording/reproducing unit 15 (herein the HDD recording/reproducing block 153) according to the broadcasting format identified by the first identification block 112, when the format decision block 114 decides that the broadcasting formats do not agree with each other.

Moreover, when the broadcasting format identified by the first identification block 112 is the SECAM format, the recording execution block 116 records video information of the PAL format, which results from PAL conversion performed by the format conversion block 115, in the second recording medium (herein the HDD 4).

Figure 3:
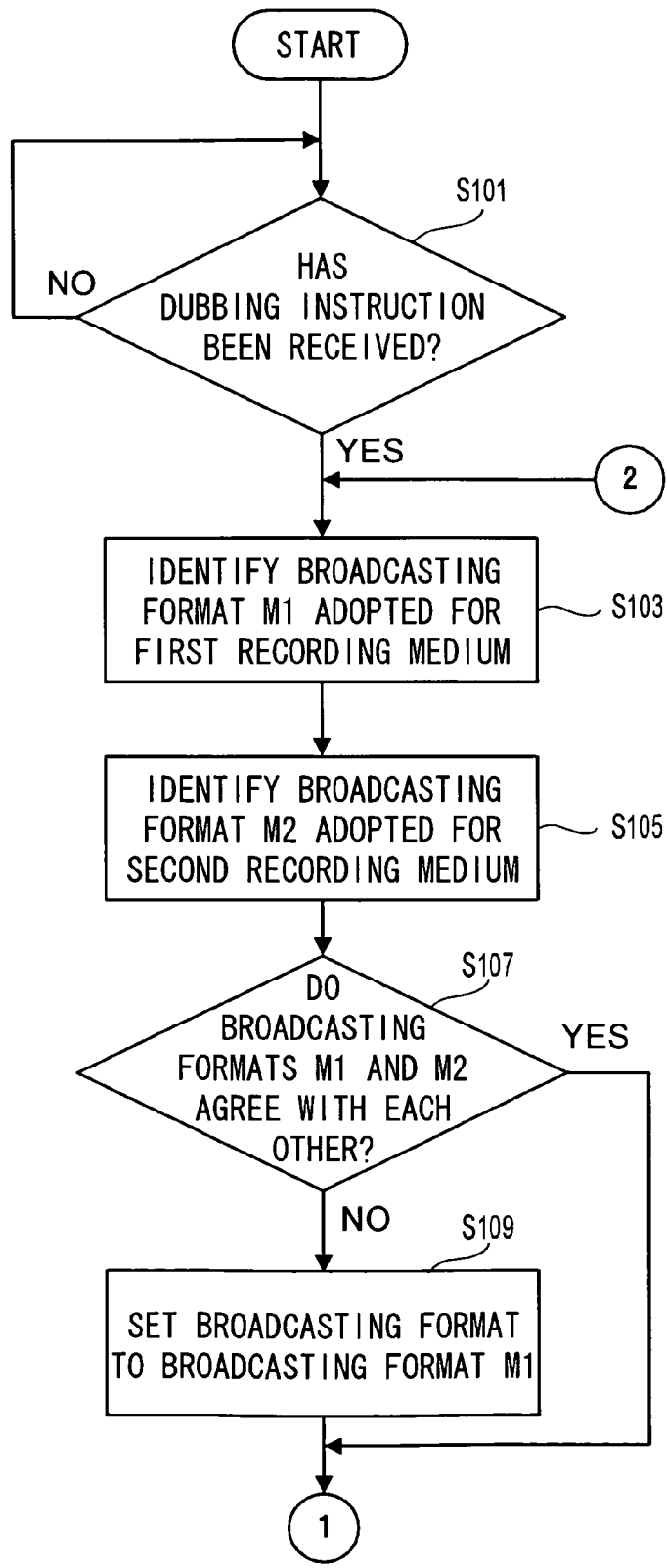
FIG. 3 is a flowchart (first half) presenting an example of the operation of the DVD recorder in accordance with this invention.
Figure 4:
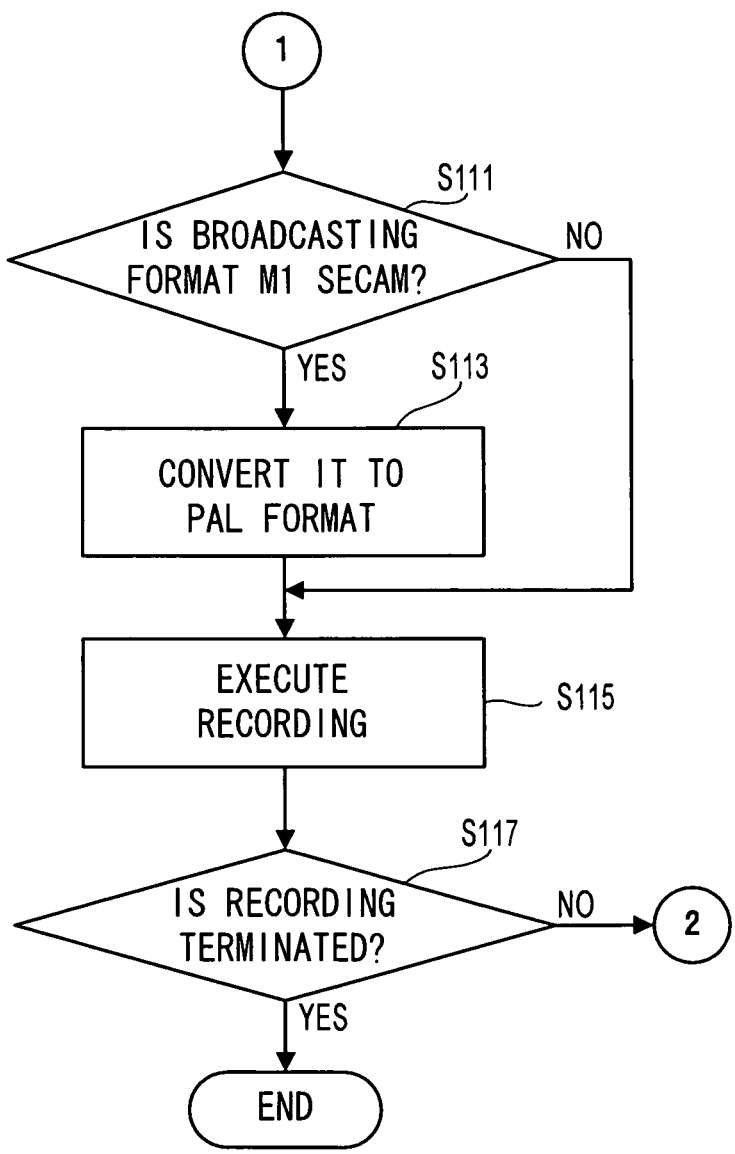
FIG. 4 is a flowchart (second half) presenting the example of the operation of the DVD recorder in accordance with this invention.

FIG. 3 and FIG. 4 are flowcharts describing an example of the operation of the DVD recorder 1 in accordance with this invention. Herein, for convenience' sake, a description will be made of a case where the processing designation block 111 sets in advance the first recording medium (dubbing source recording medium) to the VC 2 and the second recording medium (dubbing destination recording medium) to the HDD 4. First, the processing designation block 111 decides whether an instruction signifying that dubbing processing should be executed has been received (S101). If a decision is made that the instruction signifying that dubbing processing should be executed has not been received (No at S101), processing is brought to a standby state.

If a decision is made that the instruction signifying that dubbing processing should be executed has been received (Yes at S101), the first identification block 112 reads video information from the first recording medium (herein the VC 2), and identifies the broadcasting format M1 of the read video information using the format identification circuit 151a, 152a, or 153a (herein the format identification circuit 151a) (S103). The second identification block 113 identifies the broadcasting format M2 of video information to be recorded in the second recording medium (herein the HDD 4) using the format identification circuit 151a, 152a, or 153a (herein the format identification circuit 153a) (S105).

Thereafter, the format decision block 114 decides whether the broadcasting format M2 identified at step S105 agrees with the broadcasting format M1 identified at step S103 (S107). If a decision is made that the broadcasting formats agree with each other (Yes at S107), the processing is advanced to step S111 mentioned in FIG. 4. If a decision is made that the broadcasting formats do not agree with each other (No at S107), the recording execution block 116 sets the broadcasting format, which is adopted for recording of video information, to the broadcasting format M1 identified at step S103 (S109).

If a decision is made in the affirmative at step S107, or if the processing of step S109 is terminated, the format conversion block 115 decides, as mentioned in FIG. 4, whether the broadcasting format M1 identified at step S103 is the SECAM format (S111). If the broadcasting format M1 is not the SECAM format (is the PAL format) (No at S111), the processing is advanced to step S115. If the broadcasting format M1 is the SECAM format (Yes at S111), the format conversion block 115 converts the broadcasting format of video information read from the first recording medium (herein the VC 2) into the PAL format (S113).

If a decision is made in the negative at step S111 or if the processing of step S113 is terminated, the recording execution block 116 records the video information (or the video information having the broadcasting format thereof converted into the PAL format at step S113), which is read from the first recording medium (herein the VC 2), in the second recording medium (Herein the HDD 4) using the recording/reproducing unit 15 (herein the HDD recording/reproducing block 153) according to the broadcasting format set at step S109 (S115). The first identification block 112 decides whether video information stored in the first recording medium (herein the VC 2) has entirely been read (whether dubbing processing received by the processing designation block 111 has terminated) (S117). If a decision is made that dubbing processing has terminated (Yes at S117), the processing is terminated. If a decision is made that the dubbing processing has not terminated (No at S117), the processing is returned to step S103 mentioned in FIG. 4, and the processing following step S103 is repeatedly executed.

As mentioned above, video information is read from the first recording medium (herein the VC 2) in which video information on an analog television broadcast is stored. The broadcasting format M1 of the read video information is identified. When the video information read from the first recording medium (herein the VC 2) is recorded in the second recording medium (herein the HDD 4) other than the first recording medium, the broadcasting format M2 of the video information to be recorded in the second recording medium is identified. A decision is made on whether the broadcasting format M2 identified at the time of recording the video information in the second recording medium agrees with the broadcasting format M1 identified at the time of reading the video information from the first recording medium. If a decision is made that the broadcasting formats do not agree with each other, the video information is recorded in the second recording medium according to the broadcasting format M1 identified at the time of reading the video information from the first recording medium. Consequently, the video information on the analog television broadcast can be properly dubbed.

Specifically, a decision is made on whether the broadcasting format M2 identified at the time of recording video information in the second recording medium (herein the HDD 4) agrees with the broadcasting format M1 identified at the time of reading the video information from the first recording medium (herein the VC 2). If a decision is made that the broadcasting formats do not agree with each other, the video information is recorded in the second recording medium according to the broadcasting format M1 identified at the time of reading the video information from the first recording medium. Consequently, for example, even when the broadcasting format M1 is identified as the SECAM format at the time of reading and the broadcasting format M2 is identified as the PAL format at the time of recording, the video information is recorded in the SECAM format that is the broadcasting format M1 identified at the time of reading. Therefore, degradation in video quality derived from loss of color information in video information or the like will not occur. The video information on an analog television broadcast can be properly dubbed.

When video information is read, the video information is reproduced in a form in which the video information can be properly displayed on a display. As long as the video information is recorded in the second recording medium (herein the HDD 4) according to the broadcasting format M1 identified at the time of reading the video information from the first recording medium (herein the VC 2), the video information on an analog television broadcast can be properly dubbed.

Moreover, the broadcasting format of video information stored in the first recording medium (herein the VC 2) is the PAL format or SECAM format. When the broadcasting format M1 identified at the time of reading the video information from the first recording medium is the SECAM format, the video information of the SECAM format is converted into video information of the PAL format, and the video information having the broadcasting format thereof converted into the PAL format is recorded in the second recording medium (herein the HDD 4). Therefore, the video information on an analog television broadcast can be further properly dubbed.

When the broadcasting format M1 identified at the time of reading video information from the first recording medium (herein the VC 2) is the SECAM format, video information having the broadcasting format thereof converted into the PAL format is recorded in the second recording medium (herein the HDD 4). The broadcasting format of video information to be recorded in the second recording medium is unified into the PAL format. Therefore, reproduction of video information recorded in the second recording medium is easy to do, and the video information on an analog television broadcast can be further properly dubbed.

Further, since the first recording medium is an analog recording medium (herein the VC 2) and the second recording medium is a digital recording medium (herein the HDD 4), video information on an analog television broadcast stored in the analog recording medium can be properly dubbed into the digital recording medium.

In addition, since the first recording medium is a magnetic tape (herein the VC 2) and the second recording medium is the HDD 4, video information on an analog television broadcast stored in the magnetic tape can be properly dubbed into the HDD 4.

The invention can be applied to modes described below.

(A) The embodiment has been described on the assumption that the video recording device is the DVD recorder 1 designed so that video information can be freely read or written in or from any of three types of recording media of the VC 2, DVD 3, and HDD 4. The video recording device should merely be a device designed so that video information can be freely read or written in or from multiple types of recording media. For example, the video recording device may be a VCR having an HDD incorporated therein.

(B) The embodiment has been described on the assumption that the MPU 11 includes the functional blocks of the processing designation block 111, first identification block 112, second identification block 113, format decision block 114, format conversion block 115, and recording execution block 116. Among the processing designation block 111, first identification block 112, second identification block 113, format decision block 114, format conversion block 115, and recording execution block 116, at least one functional block may be formed with hardware such as a circuit.

(C) The embodiment has been described on the assumption that the first recording medium is an analog recording medium (herein the VC 2) and the second recording medium is a digital recording medium (herein the HDD 4). Alternatively, the first recording medium may be the digital recording medium (for example, the DVD 3) and the second recording medium may be the analog recording medium (for example, the VC 2). In this case, video information on an analog television broadcast stored in the digital recording medium (herein the DVD 3) can be properly dubbed into the analog recording medium (herein the VC 2).

(D) The embodiment has been described on the assumption that the first recording medium is a magnetic tape (herein the VC 2) and the second recording medium is the HDD 4. Alternatively, the second recording medium may be a digital recording medium (for example the DVD 3) other than the HDD 4.

(E) The embodiment has been described on the assumption that the first recording medium is a magnetic tape (herein the VC 2) and the second recording medium is the HDD 4. Alternatively, the first recording medium may be the DVD 3 or HDD 4 and the second recording medium may be the magnetic tape (herein the VC 2). In this case, video information on an analog television broadcast stored in the DVD 3 or HDD 4 can be properly dubbed into the magnetic tape (herein the VC 2).

What is claimed is:

1. A video recording device comprising:
    a first recording/reproducing part that performs recording/reproducing with respect to a first recording medium in which video information corresponding to an analog television broadcast is stored;
    a first format identification circuit that identifies a broadcasting format of video information read from the first recording medium by the first recording/reproducing part;
    a second recording/reproducing part that performs recording/reproducing with respect to second recording medium different from the first recording medium; and
    a second format identification circuit that identifies a broadcasting format of video information to be recorded to the second recording medium by the second recording/reproducing part;
    a recording execution part that records video information read from the first recording medium to the second recording medium; and
    a format decision block that decides whether the broadcasting format identified by the second format identification circuit agrees with the broadcasting format identified by the first format identification circuit,
    wherein
        the video recording device records video information to the second recording medium according to the broadcasting format identified by the second format identification circuit,
        the first recording/reproducing part has the first format identification circuit,
        the second recording/reproducing part has the second format identification circuit, and
        when the recording execution part records the video information read from the first recording medium to the second recording medium, if the format decision block decides that the broadcasting formats identified by the first and second format identification circuits do not agree with each other, the recording execution part records video information to the second recording medium according to the broadcasting format identified by the first format identification circuit.

2. The video recording device according to claim 1, wherein:
    the broadcasting format of video information stored in the first recording medium is the phase alternating line (PAL) format or sequential couleur a memoire (SECAM) format;
    a format conversion part that when the broadcasting format identified by the first format identification circuit is the SECAM format, converts video information of the SECAM format into video information of the PAL format is included; and
    when the broadcasting format identified by the first format identification circuit is the SECAM format, the recording execution part records video information, which has the broadcasting format thereof converted into the PAL format by the format conversion part, in the second recording medium.

3. The video recording device according to claim 2, wherein the first recording medium is an analog recording medium and the second recording medium is a digital recording medium.

4. The video recording device according to claim 3, wherein the first recording medium is a magnetic tape and the second recording medium is a HDD or a DVD.

5. The video recording device according to claim 2, wherein the first recording medium is a digital recording medium and the second recording medium is an analog recording medium.

6. The video recording device according to claim 5, wherein the first recording medium is a HDD or a DVD and the second recording medium is a magnetic tape.

7. The video recording device according to claim 1, wherein the first recording medium is an analog recording medium and the second recording medium is a digital recording medium.

8. The video recording device according to claim 7, wherein the first recording medium is a magnetic tape and the second recording medium is a hard disk drive (HDD) or a digital versatile disk (DVD).

9. The video recording device according to claim 1, wherein the first recording medium is a digital recording medium and the second recording medium is an analog recording medium.

10. The video recording device according to claim 9, wherein the first recording medium is a HDD or a DVD and the second recording medium is a magnetic tape.

* * * * *